United States Patent
Dicanosa et al.

(10) Patent No.: US 10,343,553 B2
(45) Date of Patent: Jul. 9, 2019

(54) DETECTING AND SIGNALLING THE PRESENCE OF A PASSENGER INVOLUNTARILY LEFT UNATTENDED IN A MOTOR VEHICLE

(71) Applicant: C.R.F. SOCIETÀ CONSORTILE PER AZIONI, Orbassano (IT)

(72) Inventors: Claudio Dicanosa, Turin (IT); Enrico De Virgilio, Turin (IT); Salvatore Pirri, Turin (IT); Mirko Muro, Orbassano (IT); Maurizio Miglietta, Orbassano (IT)

(73) Assignee: C.R.F. SOCIETÀ CONSORTILE PER AZIONI, Orbassano (IT)

( * ) Notice: Subject to any disclaimer, the term of this patent is extended or adjusted under 35 U.S.C. 154(b) by 0 days.

(21) Appl. No.: 15/969,331

(22) Filed: May 2, 2018

(65) Prior Publication Data

US 2018/0319291 A1 Nov. 8, 2018

(30) Foreign Application Priority Data

May 4, 2017 (EP) .................... 17169596

(51) Int. Cl.
*B60N 2/00* (2006.01)
*B60Q 9/00* (2006.01)
(Continued)

(52) U.S. Cl.
CPC .............. *B60N 2/002* (2013.01); *B60Q 9/00* (2013.01); *G01S 13/04* (2013.01); *G01S 13/886* (2013.01); *G08B 21/22* (2013.01); *G08B 21/24* (2013.01)

(58) Field of Classification Search
CPC ........... B60N 2/002; B60Q 9/00; G01S 13/04; G01S 13/886; G08B 21/22
See application file for complete search history.

(56) References Cited

U.S. PATENT DOCUMENTS

| 9,266,535 | B2* | 2/2016 | Schoenberg | B60N 2/28 |
| 9,845,050 | B1* | 12/2017 | Garza | G08B 21/0205 |
| 2002/0171540 | A1* | 11/2002 | Ando | B60N 2/002 340/457 |

FOREIGN PATENT DOCUMENTS

| WO | WO 02/047942 | 6/2002 |
| WO | WO 15/140333 | 9/2015 |
| WO | WO 16/149778 | 9/2016 |

OTHER PUBLICATIONS

European Patent Office Search Report dated Nov. 30, 2017, for European Patent Application No. 17169596.8, Applicant, C.R.F. Società Consortile Per Azioni (5 pages).

* cited by examiner

*Primary Examiner* — Omeed Alizada
(74) *Attorney, Agent, or Firm* — McCracken & Gillen LLC

(57) ABSTRACT

An automotive electronic control system configured to detect and signal the presence of a passenger left unattended in a motor vehicle based on signals from an automotive sensory system comprising:
  one or more radar sensors arranged in the passenger compartment of the motor vehicle to allow the presence of one or more passengers sitting on one or more seats of the motor vehicle to be determined,
  one or more door sensors associated with one or more doors of the motor vehicle to allow locking and unlocking, and opening and closing, of one or more doors of the motor vehicle to be determined;
  one or more seat sensors associated with one or more seats of the motor vehicle to allow the presence of one or more passengers sitting on one or more seats of the motor vehicle to be determined;
(Continued)

one or more safety belt sensors associated with one or more safety belts of the motor vehicle to allow fastening and unfastening of one or more safety belts to be determined;
the automotive electronic control system is configured to:
receive signals from the automotive sensory system;
determine when the doors of the motor vehicle are unlocked;
when the doors of the motor vehicle are determined to have been unlocked, determine whether a door of the motor vehicle has been opened for a sufficient length of time compatible with a passenger getting in the motor vehicle;
if a door of the motor vehicle is determined to have been opened for a sufficient length of time compatible with a passenger getting in the motor vehicle, signal a potentially hazardous situation due to the presence of a passenger in the motor vehicle according to a first signalling mode or by means of a first signalling device;
determine when the door of the motor vehicle has been closed;
when the door of the motor vehicle is determined to have been closed, determine occurrence of a switch from a key-on state to a key-off state of the motor vehicle;
if no switch from a key-on state to a key-off state of the motor vehicle is determined to have occurred, activate one or more radar sensors to check for the presence of the passenger in the motor vehicle;
if the passenger is determined not to be on the motor vehicle based on the radar sensors, interrupt the signalling of the presence of the passenger in the motor vehicle;
if instead the passenger is determined to be on the motor vehicle based on the radar sensors, signal the presence of the passenger in the motor vehicle according to a second signalling mode and/or device different from the first signalling mode and/or device.

7 Claims, 3 Drawing Sheets

(51) Int. Cl.
*G01S 13/04* (2006.01)
*G01S 13/88* (2006.01)
*G08B 21/22* (2006.01)
*G08B 21/24* (2006.01)

DETECTING AND SIGNALLING THE PRESENCE OF A PASSENGER INVOLUNTARILY LEFT UNATTENDED IN A MOTOR VEHICLE

PRIORITY CLAIM

This application claims priority from European Patent Application No. 17169596.8 filed on May 4, 2017, the disclosure of which is incorporated by reference.

TECHNICAL FIELD OF THE INVENTION

The present invention relates in general to the safety of passengers in road motor vehicles, and in particular to detecting and signalling the presence of passengers involuntarily left unattended in motor vehicles.

The present invention finds application in any type of road motor vehicle, whether used for transporting people, such as a car, bus, camper, etc., or for transporting people and goods, such as an industrial vehicle (lorry, road train, articulated truck, etc.) or a light or medium-heavy commercial vehicle (van, truck with a covered body, chassis cab, etc.).

STATE OF THE ART

As is known, passenger safety in the automotive field has always been a key safety factor in the prevention of injuries that passengers may sustain from the use of motor vehicles.

Substantial investments have been made in recent years in the quest for technologies that enable reliably detecting and signalling the presence of passengers involuntarily left unattended in motor vehicles, especially babies or small children not yet self-sufficient, involuntarily forgotten by parents on the rear seats of motor vehicles once the destination is reached.

In the future, these technologies are destined to become standard on all motor vehicles and will enable ensuring the safety levels provided for by European and American regulations.

The technologies proposed up until now essentially provide detection for the possible presence of a passenger involuntarily left unattended in the passenger compartment of the motor vehicle, in particular on the rear seats, by means of opportune technologies, signalling the potentially hazardous situation and, in the more advanced technologies, attempting to prevent injury that might arise by implementing protective measures that substantially contemplate operating the motor vehicle's onboard signalling and control systems.

In these technologies, detecting the presence of a passenger in a motor vehicle is carried out either directly, i.e. via radar systems, vision systems and/or various types of sensing systems, such as weight sensors integrated in the seats for example, or indirectly, via buckled/unbuckled safety belt sensors or open/close door sensors.

The potentially hazardous situation is instead signalled via acoustic, visual or haptic signals, which also increasingly make use of the technologies available on personal smartphones.

Finally, the operation of the motor vehicle's onboard signalling and control systems contemplates acting on the motor vehicle's doors or windows, or on the operation of the air-conditioning system.

OBJECT AND SUMMARY OF THE INVENTION

The Applicant has observed that the technologies according to the known art, although satisfactory, still have margin for improvement in terms of detection reliability.

The object of the present invention is therefore to provide a technology that improves the reliability in detecting the presence of passengers involuntarily left unattended in motor vehicles.

According to the present invention, an automotive system for detecting and signalling the presence of passengers involuntarily left unattended in motor vehicles is provided, as claimed in the appended claims.

DETAILED DESCRIPTION OF PREFERRED EMBODIMENTS OF THE INVENTION

The present invention will now be described in detail with reference to the accompanying drawings to enable an expert in the field to embody it and use it. Various modifications to the described embodiments will become immediately obvious to experts in the field, and the generic principles described herein can be applied to other embodiments and applications without however departing from the scope of the present invention, as claimed in the appended claims. Thus, the present invention is not intended to be limited to the embodiments set forth herein, but is to be accorded the widest scope consistent with the principles and features disclosed and claimed herein.

The Applicant has noted that the reliability of detecting the presence of passengers involuntarily left unattended in motor vehicles can be significantly improved through a technological development involving integration of different technologies.

In particular, a research carried out by the Applicant has led to identifying the technologies disclosed in WO 2015/140333 A1, which discloses a technology based on radar sensors arranged in the motor vehicle passenger compartment, and in WO 2016/149778 A1, which discloses a technology based on the time, frequency and/or sequence of opening and closing the motor vehicle doors, and the content of which is to be considered entirely incorporated herein, as the two most promising technologies for integration with a view to improving reliability in detecting the presence of passengers involuntarily left unattended in motor vehicles.

Figure 1:
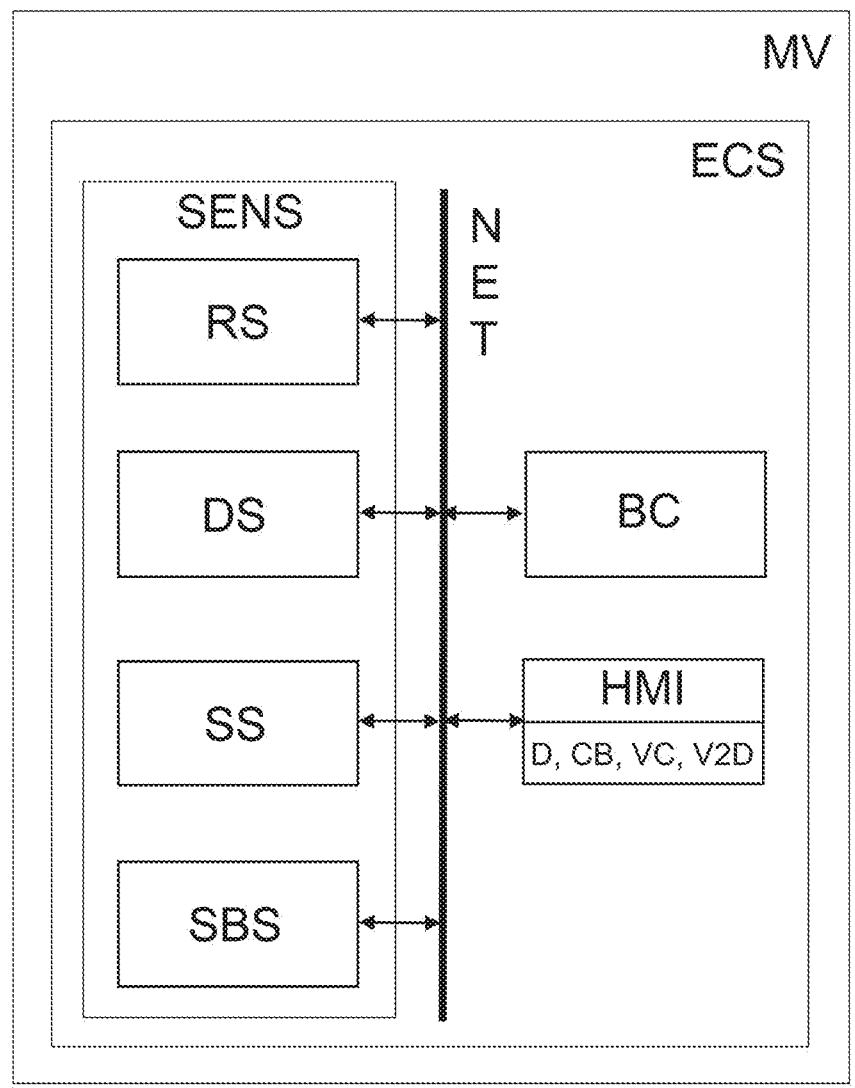
FIG. 1 shows a block diagram of an automotive system for detecting and signalling the presence of passengers involuntarily left unattended in motor vehicles, according to the present invention.

FIG. 1 shows a bock diagram of an automotive electronic control system ECS configured, inter alia, to detect and signal the presence of passengers involuntarily left unattended in a motor vehicle MV according to the present invention.

In particular, the automotive electronic control system ECS, of which only the parts pertinent to the implantation of the present invention are shown in FIG. 1, comprises:
  an automotive sensory system SENS comprising:
    one or more radar sensors RS opportunely arranged in the passenger compartment of the motor vehicle MV to allow one or more zones of interest in which passengers might possibly be involuntarily left unattended and which can expediently, but not limitatively, include at least the rear seats of the motor vehicle MV to be monitored and the possible presence of passengers involuntarily left unattended in these zones of interest to be determined;

door sensors DS associated with the doors of the motor vehicle MV to allow door locking and unlocking, as well as door opening and closing, to be detected;

seat sensors SS associated with the seats of the motor vehicle MV to allow the presence of passengers sitting on the seats to be detected; and safety belt sensors SBS associated with the safety belt buckles of the motor vehicle MV to allow fastening and unfastening of the safety belts to be detected;

a human-machine interface HMI through which passengers can interact with the on-vehicle systems and with their own personal mobile electronic devices, and comprising, inter alia:

a display D, expediently a touch-sensitive display, selection and activation buttons CB, typically arranged on the steering wheel and/or on the dashboard of the motor vehicle MV, an (optional) voice command system VC, and a short-range bidirectional wireless communications system, hereinafter referred to as V2D (from Vehicle-to-Device) communications system, operable to detect and identify, within its communications range, short-range bidirectional wireless communications systems, hereinafter referred to as D2V (from Device-to-Vehicle) communications systems, of personal mobile electronic devices on board the motor vehicle, and to establish communications with the detected and identified D2V communications systems, if necessary after an opportune pairing process;

a body computer BC connected to the on-vehicle components/systems, including those described above, by means of an automotive onboard communication network NET, for example CAN, FlexRay or others, and programmed, inter alia, to detect and signal the presence of passengers involuntarily left unattended in motor vehicles based on signals from the above-listed sensors, in the manner described in detail hereinafter with reference to the flowchart shown in FIGS. 2A and 2B and, for brevity, referred to as FOA (from Forgotten Occupant Alert) functionality.

In particular, for convenience and purely by way of non-limitative example, the FOA feature will be described, without any loss of generality, with reference to detecting the presence of a passenger involuntarily left unattended on a rear seat of a motor vehicle. In fact, the present invention can find application for detecting the presence of one or more passengers involuntarily left unattended on one or more seats of the motor vehicle.

Moreover, the term body computer is not meant to just indicate the specific automotive electronic component to which the implementation of the FOA feature will be actually entrusted, but any electronic processing unit, concentrated or distributed, present or future, to which implementation of the FOA feature might be entrusted.

Figure 2A:
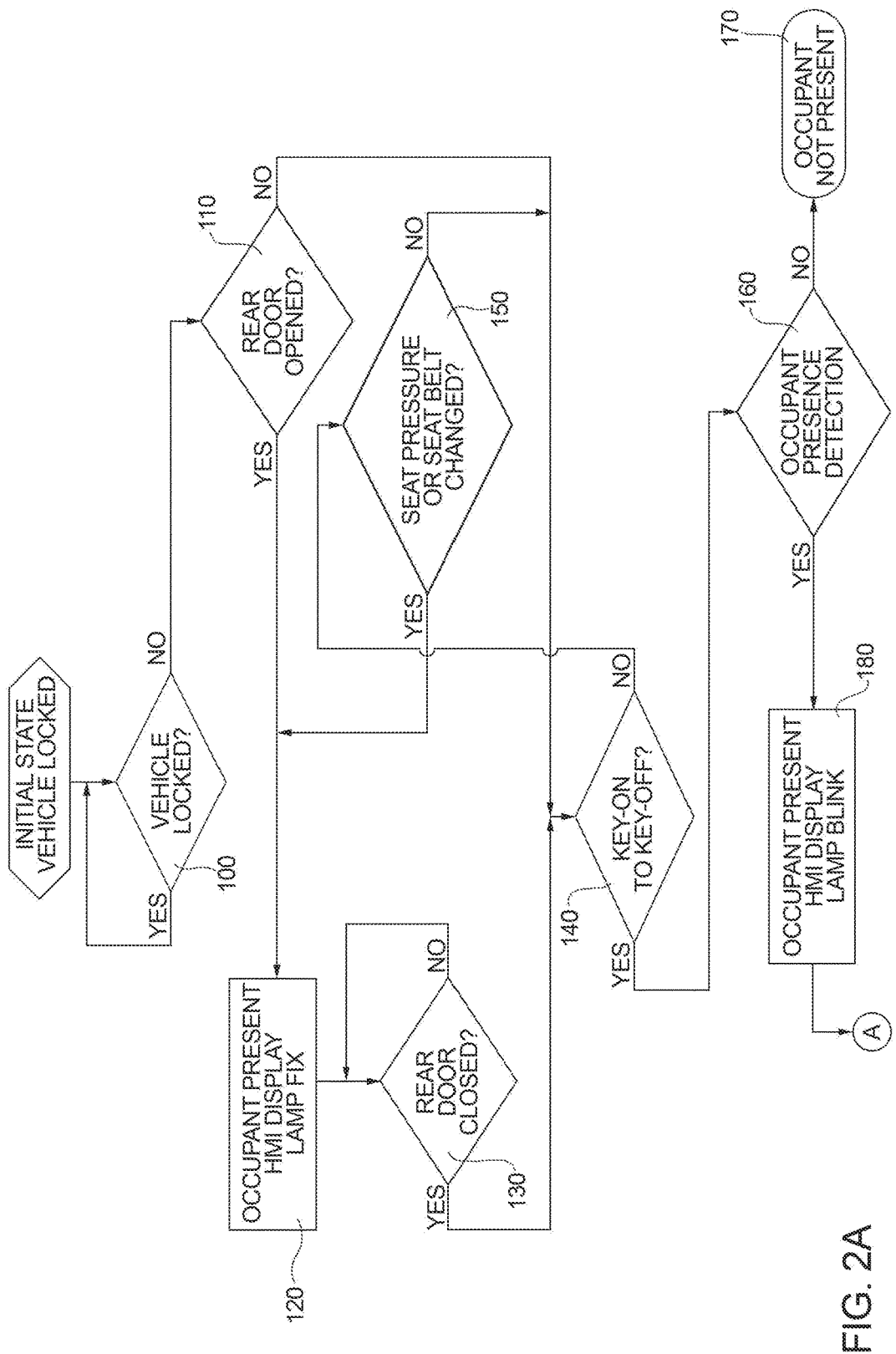
FIGS. 2A and 2B show flowcharts of the operations performed by the automotive system for detecting and signalling the presence of passengers involuntarily left unattended in motor vehicles in FIG. 1.
Figure 2B:
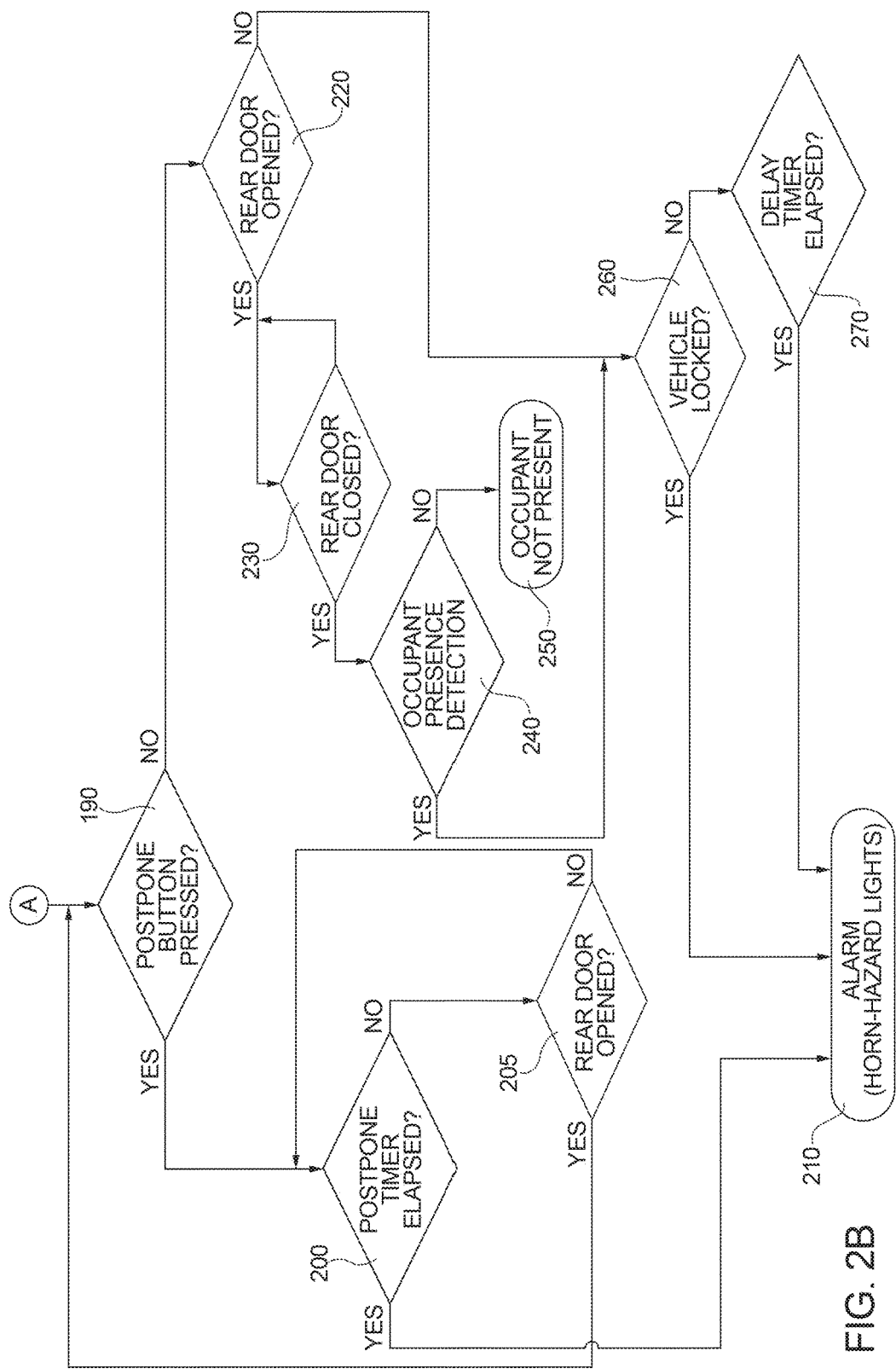

With reference to the flowcharts shown in FIGS. 2A and 2B, in order to implement the FOA feature, the body computer BC is programmed to:

determine when the doors of the motor vehicle are unlocked (block 100);

when the doors of the motor vehicle are determined to have been unlocked (NO exit from block 100), determine whether a rear door has been opened for a sufficient length of time compatible with a passenger getting in the motor vehicle, for example, a few seconds (block 110);

if a rear door is determined to have been opened for a sufficient length of time compatible with a passenger getting in the motor vehicle (YES exit from block 110), signal a potentially hazardous situation due to the presence of a passenger in the motor vehicle MV, in the example considered, a passenger sitting on a rear seat of the motor vehicle MV, who might possibly be involuntarily left unattended. Expediently, this signalling can be visual and possibly also acoustic, and could, for example, be provided by activating a signalling device, expediently of a luminous (indicator light) and/or acoustic type, arranged in the passenger compartment of the motor vehicle MV, according to a first signalling mode, for example, in a steady-lit manner (block 120);

determine when the rear door has been closed (block 130);

when the rear door is determined to have been closed (YES exit from block 130), or that no rear door has been opened, or that a rear door has been opened but not for a sufficient length of time compatible with a passenger getting in the motor vehicle MV, for example, a rear door has been opened to just lay an object on the rear seats of the motor vehicle (NO exit from block 110), determine occurrence of a switch from a key-on state to a key-off state of the motor vehicle MV (block 140). The key-on and key-off states are operating states of the motor vehicle MV that depend on the type of access and ignition key of the motor vehicle MV and which correspond to the on and off states of the instrument cluster panel (ICP). By way of non-limitative example, in the case of an electronic access and ignition key of the type with a traditional mechanical key, the key-on state is represented by the fact that an encoded electronic key has been recognised by the body computer BC and its mechanical key is mechanically inserted in the ignition switch and this is in the ON position, while the key-off state is represented by the fact that ignition switch is in the OFF position. The switch from a key-on state to a key-off state is indicative of fact that the motor vehicle has accomplished a mission and reached its destination, and so recognition of the switch from a key-on state to a key-off state is indicative of a potential hazardous condition deriving from the possibility that a passenger might be involuntarily left unattended on the rear seats of the motor vehicle;

if no switch from a key-on state to a key-off state is determined to have occurred (NO exit from block 140), determine, based on the signals from the seat sensors SS associated with the rear seats and/or from the safety belt sensors SBS associated with the safety belts of the rear seats, occurrence of a state change in the presence of passengers sitting on the rear seats or in the buckling/unbuckling of the safety belts associated with the rear seats (block 150);

if no state change is determined to have occurred (NO exit from block 150), return to block 140 to repeat determining occurrence of a switch from a key-on state to a key-off state;

if a state change is determined to have occurred, return to block 120 to repeat signalling a potentially hazardous situation due to the presence of a passenger in the motor vehicle MV, in the example considered, a passenger sitting on a rear seat of the motor vehicle MV, who might have been involuntarily left unattended;

when a switch from a key-on state to a key-off state is instead determined to have occurred (YES exit from block 140), activate one or more radar sensors RS to check, based on the radar signals received by the activated radar sensors RS, the presence of a passenger on a rear seat of the motor vehicle (block 160);

if no passenger is determined to be sat on a rear seat of the motor vehicle MV (NO exit from block 160), interrupt the signalling of the potentially hazardous situation due to the presence of a passenger in the motor vehicle MV (block 170);

if instead a passenger is determined to be sat on a rear seat of the motor vehicle MV (YES exit from block 160), visually, and possibly also acoustically, signal the presence of a passenger on a rear seat of the motor vehicle MV in a different manner from the signalling in block 120, for example, by activating the same luminous and/or acoustic signalling device that is activated in block 120 but in a second signalling mode different from the first, for example intermittently, or by activating a different luminous and/or acoustic signalling device (block 180);

then check activation of a manually-activatable time postponement device, expediently in the form of a button, the activation of which is indicative of the awareness of the person activating the time postponement button of the presence of a passenger sitting on a rear seat of the motor vehicle MV, and allows a successive visual, and expediently also acoustic, signalling of the presence of a passenger on a rear seat of the motor vehicle to be time postponed, as described below (block 190);

if the time postponement button is determined to have been activated (YES exit from block 190), check if a time postponement interval has elapsed, for example 5 minutes, since activation of the time postponement button (block 200);

if the time postponement interval is determined to have elapsed (YES exit from block 200), signal the presence of a passenger left unattended on a rear seat of the motor vehicle and cause this presence to be visually and/or acoustically signalled according to a third signalling mode and/or by a third signalling device different from those activated for the previous signalling, for example by activating the motor vehicle's emergency lights and horn (block 210);

if the time postponement interval is determined not to have elapsed yet (NO exit from block 200), determine whether a rear door has been opened (block 205);

if no rear door is determined to have been opened (NO exit from block 205), return to block 200 to repeat checking whether the time postponement interval has elapsed;

if a rear door is instead determined to have been opened (YES exit from block 205), return to block 190 to repeat checking activation of the time postponement button;

if the postponement button is determined not to have been activated (NO exit from block 190), determine whether a rear door of the motor vehicle has been opened for a sufficient length of time compatible with a passenger getting out of the motor vehicle, for example, a few seconds (block 220);

if a rear door is determined to have been opened for a sufficient length of time compatible with a passenger getting out of the motor vehicle (YES exit from block 220), determine when the rear door of the motor vehicle MV has been closed (block 230);

when the rear door is determined to have been closed (YES exit from block 230), activate the radar sensors RS and determine, based on radar signals received by the activated radar sensors RS, the presence of a passenger on a rear seat of the motor vehicle MV (block 240);

if no passenger is determined to be sat on a rear seat of the motor vehicle MV (NO exit from block 240), interrupt the signalling of the presence of a passenger on a rear seat of the motor vehicle MV activated in block 180 (block 250);

if instead, in block 250, a passenger is determined to be sat on a rear seat of the motor vehicle MV (YES exit from block 240) or, in block 220, no rear door of the motor vehicle MV is determined to have been opened for a sufficient length of time compatible with a passenger getting out of the motor vehicle MV (NO exit from block 220), determine whether the doors of the motor vehicle MV have been locked (block 260);

if the doors of the motor vehicle MV are determined to have been locked (NO exit from block 260), determine whether a time delay interval, shorter than the time postponement interval, for example 20 seconds, has elapsed from when, in block 180, the presence of a passenger on a rear seat of the motor vehicle MV has started to be signalled (block 270);

if the time delay interval is determined not to have elapsed yet (NO exit from block 270), return to block 220 to repeat determining whether a rear door of the motor vehicle has been opened for a sufficient length of time compatible with a passenger getting out of the motor vehicle MV;

when, in block 260, the doors of the motor vehicle MV are determined to have been locked (YES exit from block 260), or when, in block 270, the time delay interval is determined to have elapsed (YES exit from block 270), return to block 210 to activate the visual and/or acoustic signalling described with reference to block 210.

The invention claimed is:
1. An automotive electronic control system (ECS) configured to detect and signal the presence of a passenger left unattended in a motor vehicle (MV) based on signals from an automotive sensory system (SENS) comprising:
one or more radar sensors (RS) arranged in the passenger compartment of the motor vehicle (MV) to allow the presence of one or more passengers sitting on one or more seats of the motor vehicle (MV) to be determined,
one or more door sensors (DS) associated with one or more doors of the motor vehicle (MV) to allow locking and unlocking, and opening and closing, of one or more doors of the motor vehicle (MV) to be determined;
one or more seat sensors (SS) associated with one or more seats of the motor vehicle (MV) to allow the presence of one or more passengers sitting on one or more seats of the motor vehicle (MV) to be determined;
one or more safety belt sensors (SBS) associated with one or more safety belts of the motor vehicle (MV) to allow fastening and unfastening of one or more safety belts to be determined;
the automotive electronic control system (ECS) is configured to:
receive signals from the automotive sensory system (SENS);

determine when the doors of the motor vehicle (MV) are unlocked (100);

when the doors of the motor vehicle (MV) are determined to have been unlocked, determine whether a door of the motor vehicle (MV) has been opened for a sufficient length of time compatible with a passenger getting in the motor vehicle (110);

if a door of the motor vehicle (MV) is determined to have been opened for a sufficient length of time compatible with a passenger getting in the motor vehicle, signal (120) a potentially hazardous situation due to the presence of a passenger in the motor vehicle (MV) according to a first signalling mode or by means of a first signalling device;

determine (130) when the door of the motor vehicle (MV) has been closed;

when the door of the motor vehicle (MV) is determined to have been closed, determine (140) occurrence of a switch from a key-on state to a key-off state of the motor vehicle (MV);

if no switch from a key-on state to a key-off state of the motor vehicle (MV) is determined to have occurred, activate one or more radar sensors (RS) to check for the presence of the passenger in the motor vehicle (160);

if the passenger is determined not to be on the motor vehicle (MV) based on the radar sensors (RS), interrupt the signalling of the presence of the passenger in the motor vehicle (170);

if instead the passenger is determined to be on the motor vehicle (MV) based on the radar sensors (RS), signal the presence of the passenger in the motor vehicle (MV) according to a second signalling mode and/or device different from the first signalling mode and/or device.

2. The automotive electronic control system (ECS) of claim 1, further configured to:

if no switch from a key-on state to a key-off state of the motor vehicle (MV) is determined to have occurred, determine (150) occurrence of a change of state regarding the seat sensors (SS) and/or the safety belt sensors (SBS);

if no change of state is determined to have occurred, repeat determining (140) occurrence of a switch from a key-on state to a key-off state of the motor vehicle (MV);

if a change of state is determined to have occurred, repeat signalling (120) the presence of a passenger in the motor vehicle (MV) according to the first signalling mode or by means of the first signalling device.

3. The automotive electronic control system (ECS) of claim 1, for a motor vehicle (MV) further comprising a manually-activatable time postponement device, activation of which is indicative of the awareness of the presence of a passenger in the motor vehicle (MV) and results in a time postponement of a successive signalling of the presence of the passenger in the motor vehicle (MV);

the automotive electronic control system (ECS) is further configured to:

after the start of the signalling of the presence of the passenger in the motor vehicle (MV) according to a second signalling mode and/or device, determine activation of the time postponement device (190);

if the time postponement device is determined to have been activated (YES exit from block 190), determine whether a time postponement interval has elapsed since activation of the time postponement device (200);

if the time postponement interval I determined to have elapsed, signal (210) the presence of the passenger in the motor vehicle (MV) according to a third signalling mode and/or a third signalling device different from the first and the second signalling modes and/or devices;

if the time postponement interval is determined not to have lapsed yet, determine whether a door through which the passenger could get out of the motor vehicle (MV) has been opened (block 205);

if the door is determined to be closed, determine whether the time postponement interval (200) has elapsed;

if the door is determined to have been opened, determine activation of the time postponement device (190);

if the time postponement device is determined not to have been activated, determine (220) whether a door of the motor vehicle (MV) through which the passenger could get out of the motor vehicle (MV) has been opened for a sufficient length of time compatible with the passenger getting out of the motor vehicle (MV);

if the door of the motor vehicle (MV) is determined to have been opened for a sufficient length of time compatible with the passenger getting out of the motor vehicle (MV), determine when the door of the motor vehicle (MV) has been closed (230);

when the door of the motor vehicle (MV) is determined to have been closed, activate (240) one or more radar sensors (RS) to check for the presence of the passenger in the motor vehicle (MV);

if the passenger is determined not to be on the motor vehicle (MV) based on the radar sensors (RS), interrupt (250) the signalling of the presence of the passenger in the motor vehicle (MV);

if the passenger is determined to be on the motor vehicle (MV) based on the radar sensors (RS) or that no door of the motor vehicle (MV) has been opened for a sufficient length of time compatible with the passenger getting out of the motor vehicle (MV), determine (260) whether the doors of the motor vehicle (MV) have been locked;

if the doors of the motor vehicle (MV) are determined not to have been locked, determine (270) whether a time delay interval has elapsed from when the presence of the passenger in the motor vehicle (MV) has started to be signalled; and if the time delay interval is determined to have elapsed or the doors of the motor vehicle (MV) are determined to have been locked, signal the presence of the passenger in the motor vehicle (MV) according to a third signalling mode and/or device different from the first and second signalling modes and/or devices (210).

4. The automotive electronic control system (ECS) of claim 3, wherein the time delay interval is shorter than the time postponement interval.

5. The automotive electronic control system (ECS) of claim 3, wherein the time postponement device is a button arranged in the motor vehicle (MV).

6. A motor vehicle, comprising:

an automotive sensory system (SENS) comprising:

one or more radar sensors (RS) arranged in the passenger compartment of the motor vehicle (MV) to allow the presence of one or more passengers sitting on one or more seats of the motor vehicle (MV) to be determined, one or more door sensors (DS) associated with one or more doors of the motor vehicle (MV) to allow locking and unlocking, and opening and closing, of one or more doors of the motor vehicle (MV) to be determined;

one or more seat sensors (SS) associated with one or more seats of the motor vehicle (MV) to allow the presence of one or more passengers sitting on one or more seats of the motor vehicle (MV) to be determined;

one or more safety belt sensors (SBS) associated with one or more safety belts of the motor vehicle (MV) to allow fastening and unfastening of one or more safety belts to be determined; and an automotive electronic control system (ECS) according to claim 1.

7. A non-transitory computer readable medium storing a software loadable in an electronic processor (BC) of an automotive electronic control system (ECS) and designed to cause, when executed, the automotive electronic control system (ECS) to become configured as claimed in claim 1.

* * * * *

UNITED STATES PATENT AND TRADEMARK OFFICE
CERTIFICATE OF CORRECTION

PATENT NO. : 10,343,553 B2
APPLICATION NO. : 15/969331
DATED : July 9, 2019
INVENTOR(S) : Claudio Dicanosa et al.

Page 1 of 1

It is certified that error appears in the above-identified patent and that said Letters Patent is hereby corrected as shown below:

In the Claims

In Claim 1, Column 7, Line 22, the text "if no switch from a key-on state" should read --if a switch from a key-on state--.

Signed and Sealed this
Eighth Day of September, 2020

Andrei Iancu
*Director of the United States Patent and Trademark Office*